UNITED STATES PATENT OFFICE.

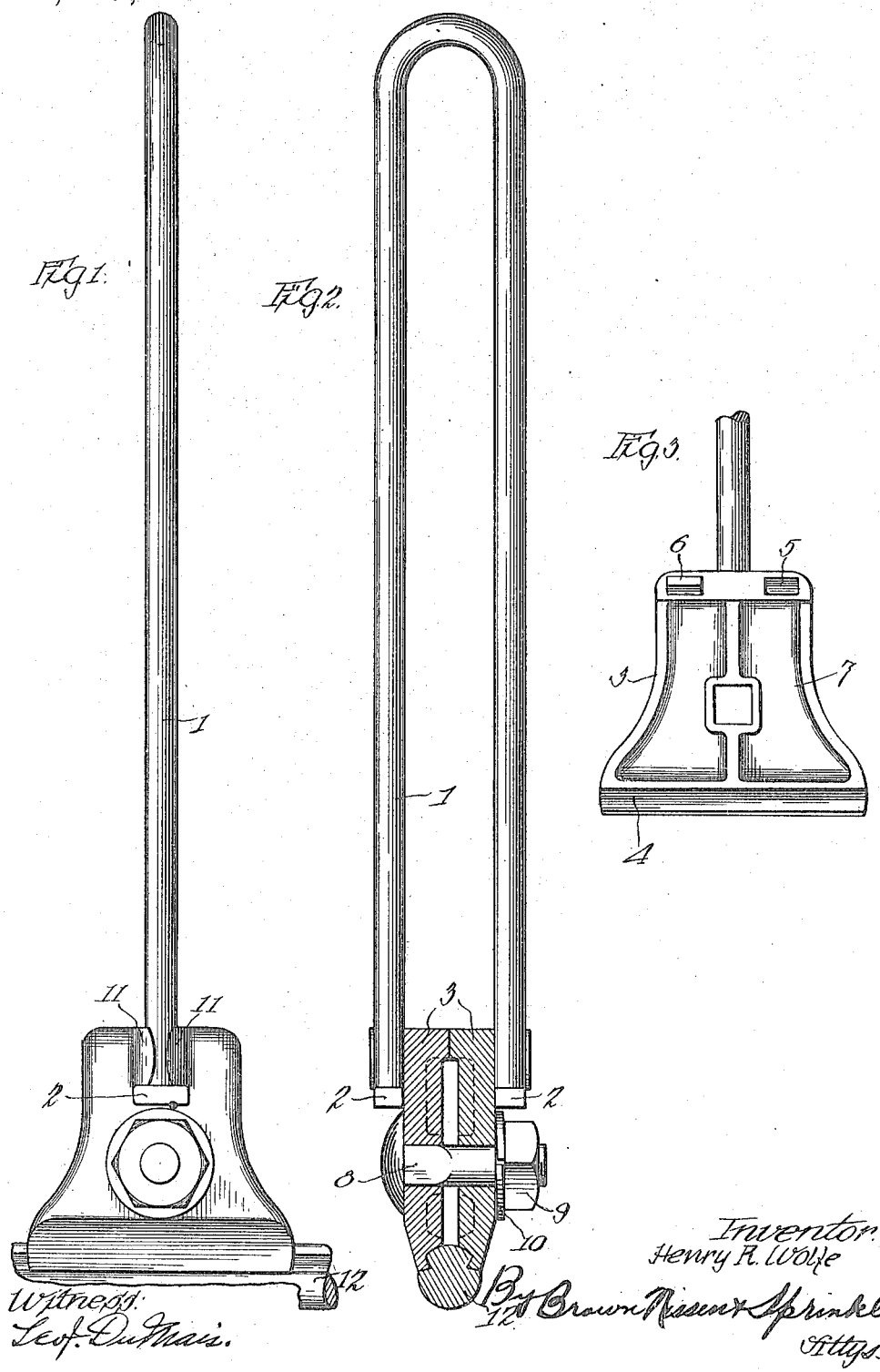

HENRY R. WOLFE, OF MANSFIELD, OHIO, ASSIGNOR TO THE OHIO BRASS COMPANY, OF MANSFIELD, OHIO, A CORPORATION OF NEW JERSEY.

CATENARY HANGER.

1,207,459.  Specification of Letters Patent.  Patented Dec. 5, 1916.

Application filed November 10, 1915. Serial No. 60,627.

*To all whom it may concern:*

Be it known that I, HENRY R. WOLFE, a citizen of the United States, residing at Mansfield, in the county of Richland and State of Ohio, have invented certain new and useful Improvements in Catenary Hangers, of which the following is a specification.

This invention relates to a hanger especially designed for use in connection with trolley wires but applicable to other electrical conductors and the wires or cables that are suspended from a messenger wire.

The invention consists in the construction, combination and arrangement of the several parts.

In the drawings, Figure 1 is a side elevation of a hanger constructed in accordance with the principles of this invention; Fig. 2 is a transverse view showing some of the parts in section, and Fig. 3 is a view of the inside of one of the wire clamping members.

In supporting a trolley wire from a messenger wire in a catenary suspension system it is customary to provide hangers which are secured to the trolley wire but have a loose connection with the messenger wire to permit the trolley wire to rise with respect to the messenger wire without displacing it, the hangers being graduated in length so that in the normal suspension of the trolley wire it is substantially horizontal, the different lengths of hangers compensating for the curve in the messenger wire. By fastening the arms of the suspension member directly to the clamping members of the wire holder all of the parts with the exception of the clamping bolt are held rigidly in position. In order, therefore, to apply the hanger it is necessary only to remove the bolt and spring the wire holding members apart to insert the messenger wire and then to apply the clamping jaws to the trolley wire. The clamping bolt can be readily inserted through the jaw members for the reason that they are held rigidly in alinement by the suspension member. Thus there are only two parts to hold in applying the hanger; the clamping members and the fastening device.

In the drawings the suspension member 1 is preferably U-shaped in construction with equal parallel ends each of which is formed with a T-shaped projection 2. The wire clamping device consists of two counterpart members 3 each formed at the bottom with a wire-engaging groove 4 and at the top with a projection 5 in a corresponding recess 6 which serve to assist in alining the device. Intermediate the top and bottom is a rectangular opening 7 through which a headed bolt 8 may be inserted, the opening being of a shape to engage a corresponding angular portion of the bolt to prevent it from turning in the hole. A nut 9 is adjustable on the threaded end of the bolt and a spring washer 10 is interposed between the nut 9 and one of the clamping members 3.

In order to secure the suspension member 1 to the clamping members 3, any suitable means may be employed, but as shown in the drawings, each of the clamping members 3 is formed with a groove at the sides of which are bendable lips 11. The headed end 2 of one extremity of the suspension member is inserted between the bendable lugs 11 with the T-head disposed below the lugs so that after the lugs are bent about the member the head will be rigidly seated against the clamping member 3 holding the suspension member and the clamping members rigidly in connection and the clamping members in alinement with each other so that the bolt 8 may be rigidly inserted through the perforation 7. With this construction all of the parts are rigidly held in their proper positions and in order to apply or remove the hanger it is necessary only to remove the bolt whereupon the clamping members can be sprung apart and passed over the messenger wire into or out of engagement with a trolley wire 12.

What I claim is:

1. In a catenary hanger, the combination with a trolley wire holder comprising separate jaws, and a suspension member having parallel arms with upset ends, one of which is rigidly attachable to each jaw, the upset ends holding the jaws parallel.

2. The combination with coöperating wire clamping jaws, of a suspension member having parallel arms with upset ends one of which is rigidly attached to each jaw, and a clamping device for the jaws to hold them engaging a wire, the upset ends holding the jaws parallel.

3. A catenary hanger comprising a suspension member having parallel spaced arms, wire clamping jaws each having integral lugs adapted to engage and hold one of the arms affixed thereto, and a bolt and nut to clamp the jaws in engagement with a wire.

4. A catenary hanger comprising a resilient suspension member having parallel spaced arms each formed with a T head, wire clamping jaws each formed with a groove with bendable integral lugs adapted to be bent about one arm with the head seated below the lugs, and a fastening bolt and nut to clamp the jaws to engage a wire.

5. A catenary hanger comprising a metal U-shaped member with an enlarged head on each extremity, and a wire clamp having separate jaw members each secured to one extremity of the U-shaped member and both held in alinement by the said heads.

6. A catenary hanger comprising a resilient U-shaped member with T-headed extremities, a wire clamp comprising similar perforated jaw members each secured to one extremity of the U-shaped member and held in alinement by the T-head, and a fastening nut and bolt insertible through the perforations.

7. In a catenary hanger, the combination with a wire clamp consisting of a pair of jaws and means to press them together, and a suspension member having parallel arms with projections at the ends each separately attachable to one of the jaw members, the projection of each end of the suspension member holding the jaw in position with respect to the other and preventing their displacement with respect to each other when the said means is entirely removed.

In testimony whereof I have signed my name to this specification, in the presence of two subscribing witnesses, on this 5th day of Nov. A. D. 1915.

HENRY R. WOLFE.

Witnesses:
F. L. BUCHAN,
D. S. PORCH.

Copies of this patent may be obtained for five cents each, by addressing the "Commissioner of Patents. Washington, D C."